Jan. 12, 1960 C. RABIN 2,920,727
COMBINATION BRAKE AND ACCELERATOR
Filed Jan. 24, 1958 2 Sheets-Sheet 1
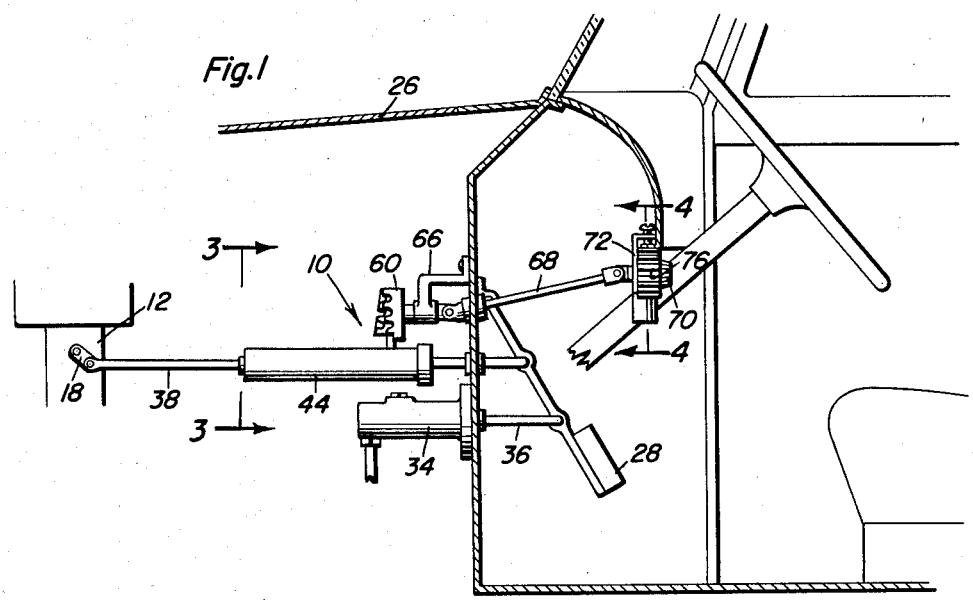
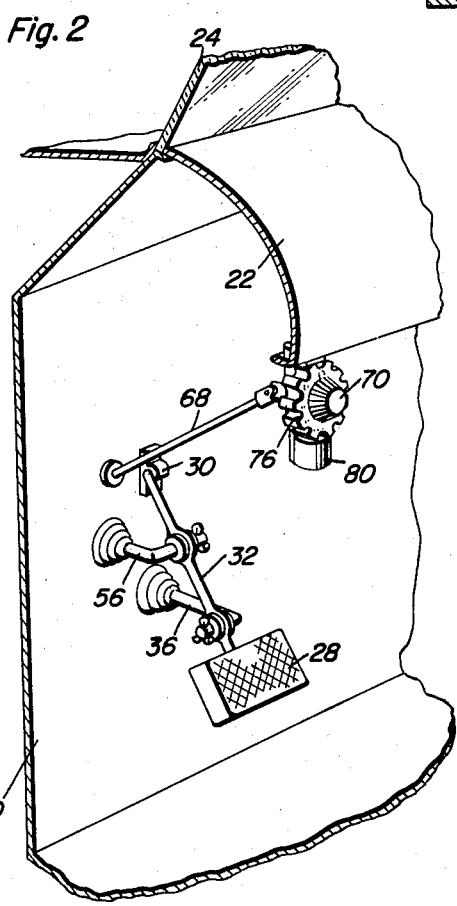
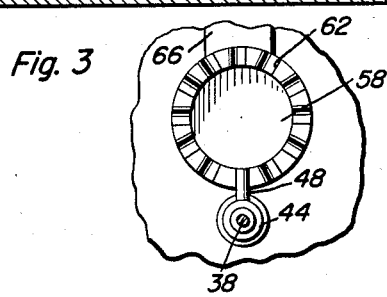
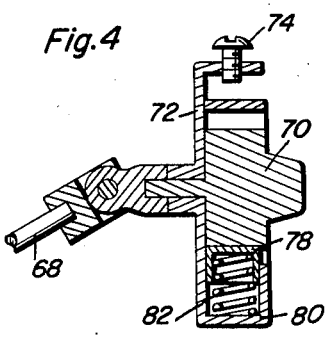
Charles Rabin
INVENTOR.
BY *Clarence A. O'Brien
and Harvey B. Jacobson*
Attorneys Jan. 12, 1960     C. RABIN     2,920,727
COMBINATION BRAKE AND ACCELERATOR
Filed Jan. 24, 1958     2 Sheets-Sheet 2
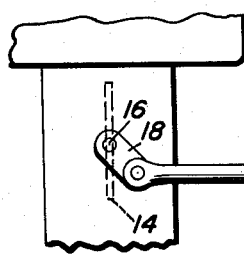
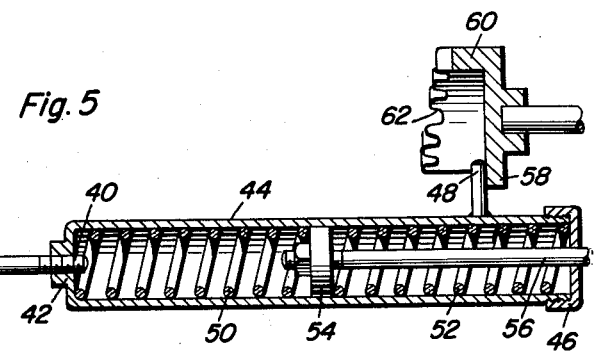
Fig. 5
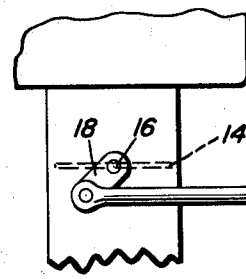
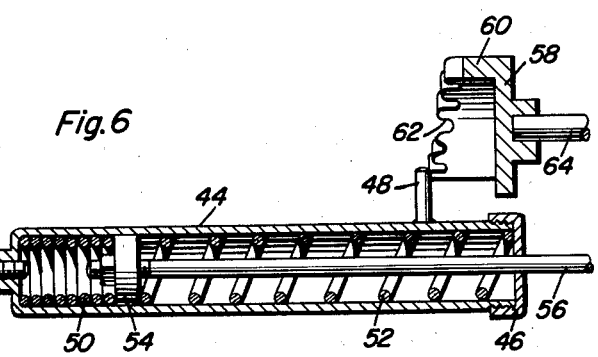
Fig. 6
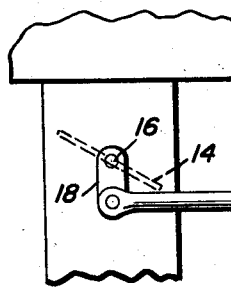
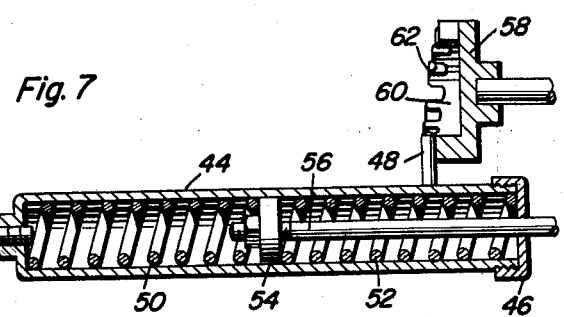
Fig. 7
Charles Rabin
INVENTOR.
BY *Clarence A. O'Brien*
*and Harvey B. Jacobson*
Attorneys

United States Patent Office 2,920,727
Patented Jan. 12, 1960

2,920,727
COMBINATION BRAKE AND ACCELERATOR
Charles Rabin, Metairie, La.

Application January 24, 1958, Serial No. 710,929

4 Claims. (Cl. 192—3)

The present invention generally relates to a control device for automobiles or similar type vehicles having an internal combustion engine with a carburetor normally provided with a throttle valve for controlling the inlet of a fuel and air mixture in which there is incorporated a construction providing for closing of the throttle valve when the brakes of the vehicle are applied and providing for opening of the throttle valve when the brakes are released.

The primary object of the present invention is to provide a combination brake and accelerator specifically adapted for use in conjunction with automobiles having automatic transmissions but which may be employed with other types of automobiles.

A further object of the present invention is to provide a combined brake and accelerator in which a connection is provided between the brake pedal and the throttle valve whereby application of pressure on the brake pedal will serve to close the throttle valve with upward movement of the brake pedal when released causing opening movement of the throttle valve with there being provided means for manually adjusting the opening movement of the throttle valve thus controlling the speed of the vehicle and also automatically closing the throttle valve when the brakes are applied.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the present invention illustrating a schematic arrangement showing the installation of the present invention;

Figure 2 is a partial perspective view showing the detail control mechanism employed in conjunction with the present invention;

Figure 3 is a detailed sectional view taken substantially upon a plane passing along section line 3—3 of Figure 1 illustrating the details of construction thereof;

Figure 4 is a detailed sectional view taken substantially upon a plane passing along section 4—4 of Figure 1 illustrating the construction of the control knob;

Figure 5 is a longitudinal sectional view of the device of the present invention illustrating the orientation of the device when the throttle valve is fully opened;

Figure 6 is a sectional view similar to Figure 5 illustrating the orientation of the structure when the throttle valve is fully closed; and Figure 7 is a sectional view similar to Figure 5 illustrating the orientation of the elements when the throttle valve has been partially opened.

Referring now specifically to the drawings, the numeral 10 generally designates the combined brake and accelerator construction of the present invention which is illustrated in conjunction with an automobile having a carburetor 12 with the usual butterfly type throttle valve 14 mounted on a shaft 16 with the shaft 16 having an offset arm or lever 18 connected thereto. The vehicle also is provided with a firewall 20 separating the engine compartment from the passenger carrying compartment and is also provided with the usual instrument panel 22, windshield 24, hood 26 and brake pedal 28 pivotally mounted from a bracket 30 on the inner surface of the firewall 20. The pedal 28 is supported from the bracket 30 by an elongated lever 32 which suspends the brake pedal 28 from the firewall 20. Also spring means is provided for returning the pedal 28 to a normal position. The pedal 28 may be of any conventional construction and may be similar to that type of brake pedal found on many moderndαy automobiles. Also mounted on the firewall 20 is a master cylinder 34 connected to the lever 32 by a piston rod 36 for actuating the master cylinder 34 in the usual manner. Any suitable means may be provided for interconnecting the piston rod 36 and lever 32 to compensate for the actuate swing of the lever 32 so that the piston in the master cylinder 34 will move properly. The arrangement of the master cylinder 34 and its relationship to the pedal 28 may also be conventional.

Attached to the offset arm 18 is an elongated rod 38 having the free end thereof externally threaded as indicated by the numeral 40 for threaded engagement with the apertured end 42 of an elongated tubular member 44. The tubular member 44 is provided with a removable closure cap 46 at the other end thereof and is provided with an upstanding stock pin 48 on the outer surface thereof which extends radially from the tubular member 44. Disposed within the tubular member 44 is a pair of coil springs 50 and 52 which are disposed in longitudinal opposed alignment with a circular disk or piston 54 separating these springs. The piston 54 is rigidly secured to the inner end of an elongated piston rod 56 which is terminally and pivotally attached to the lever 32 as clearly shown in Figure 2.

Disposed in engagement with the pin 48 is a circular disk 58 having a cylindrical projection 60 provided with a series of notches 62 which are of different depth, that is the bottom of the notches 62 are progressively further away from the surface of the circular disk 58. The disk 58 is attached to a rod 64 journaled from a bracket 66 on the firewall 20 and connected through a rod 68 and two universal joints to an operating knob 70 which is mounted on a supporting bracket 72 supported from the inturned flange on the instrument panel 22 by a clamp screw 74. The knob 70 is provided with a series of notches 76 for engagement by a spring urged dent 78 slidably disposed in a cylindrical projection 80 on the bracket 72 and urged into engagement with the knob 70 by a compression spring 82. The notches 76 may have numerical indicia adjacent each one whereby a speed may be set by positioning the knob 70 in the proper position thus positioning the disk 76 and the notches 62 in the proper position for receiving and engaging the pin 48 in the desired manner.

In operation, the throttle valve 14 is open when the pin 48, tubular member 44 and rod 38 move in a direction away from the carburetor. Thus when the pin 48 rests against the front surface of the circular disk 58, the throttle valve 14 is in a fully open position as illustrated in Figure 5. When the brake pedal 28 is depressed, the rod 56 and piston 54 connected thereto will move forwardly from the position illustrated in Figure 5 to the position illustrated in Figure 6. The spring 50 will transmit this force to the rod 38 but still will permit movement of the piston 54 to the position illustrated in Figure 6 for assuring closing movement of the throttle valve 14. When the brake pedal is then released, the spring 50 will be uncompressed while the spring 52 will be compressed which will cause the pin 48 to move into one of the notches 62 depending upon the setting of the plate or disk 58.

The foregoing is considered as illustrative only of the principles of the invention. Further, since numerous modifications and changes will readily occur to those skilled in the art, it is not desired to limit the invention to the exact construction and operation shown and described and claimed, and accordingly, all suitable modifications and equivalents may be resorted to, falling within the scope of the invention as claimed.

What is claimed as new is as follows:

1. A control mechanism for a vehicle having a foot brake pedal for applying the brakes and a pivotal throttle valve in a fuel and air supplying carburetor, said control mechanism including a rod attached to the throttle valve for opening and closing the same, a tubular member rigid with the end of the rod remote from the throttle valve, a pair of coil springs disposed in said tubular member in longitudinal end-to-end relation, a piston separating the adjacent ends of said springs, an elongated piston rod rigid with the piston and extending longitudinally from the end of the tubular member remote from the throttle valve, the other end of said piston rod being pivotally connected to the brake pedal, closure means for the end of tubular member receiving the piston rod, and means for shifting the tubular member longitudinally for varying the position of the throttle valve, the movement of the piston rod and piston during depression of the brake pedal serving to cause longitudinal shifting of the tubular member and rod for closing the throttle valve, the spring return on the brake pedal serving to cause return of the tubular member to its former position whereby a constant throttle valve setting may be maintained, said means for shifting the tubular member longitudinally including a rotatable disk having a projecting cylindrical flange with a series of notches therein having the bottoms arranged in a spiral manner, and a radially extending pin rigid with said tubular member for engagement with one of said notches for limiting the movement of the tubular member and rod connected thereto in the direction for opening the throttle valve thus limiting the opening movement of the throttle valve.

2. The combination of claim 1 wherein said disk is connected with a rotatable shaft, a manually operated knob on the inner end of said shaft for operating the disk.

3. The combination of claim 2 wherein said knob is provided with indicia for indicating the setting together with spring urged detent means for holding the knob in position.

4. In combination with a vehicle brake pedal, a control mechanism for controlling a throttle valve comprising first means operatively connected between said brake pedal and said throttle valve for closing said throttle valve in response to a depression of said brake pedal and second means supported adjacent said first means for maintaining said throttle valve in a selected position when said brake is not depressed, said first means including a rod attached to the throttle valve for opening and closing the same, a tubular member rigid with the end of the rod remote from the throttle valve, a pair of coil springs disposed in said tubular member in longitudinal end-to-end relation, a piston separating the adjacent ends of said springs, an elongated piston rod rigid with the piston and extending longitudinally from the end of the tubular member remote from the throttle valve, the other end of said piston rod being pivotally connected to the brake pedal, a rotatable disk having a projecting cylindrical flange with a series of notches therein having the bottoms arranged in a spiral manner, and a radially extending pin rigid with said tubular member for engagement with one of said notches for limiting the movement of the tubular member and rod connected thereto in the direction for opening the throttle valve thus limiting the opening movement of the throttle valve.

References Cited in the file of this patent

UNITED STATES PATENTS

| | | |
|---|---|---|
| 2,230,527 | Crawford et al. | Feb. 4, 1941 |
| 2,367,115 | Goepfrich | Jan. 9, 1945 |
| 2,429,714 | Gedstad | Oct. 28, 1947 |
| 2,821,091 | Benner | Jan. 28, 1958 |
| 2,822,702 | Scheppe | Feb. 11, 1958 |
| 2,866,343 | Kovacs | Dec. 30, 1958 |

FOREIGN PATENTS

| | | |
|---|---|---|
| 634,886 | France | Mar. 1, 1928 |
| 97,142 | Sweden | Oct. 17, 1939 |